(12) United States Patent
Willems

(10) Patent No.: US 9,193,239 B2
(45) Date of Patent: Nov. 24, 2015

(54) PNEUMATIC SPRING DEVICE FOR A MOTOR VEHICLE

(75) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/342,185

(22) PCT Filed: Jul. 27, 2012

(86) PCT No.: PCT/EP2012/003201
§ 371 (c)(1),
(2), (4) Date: Feb. 28, 2014

(87) PCT Pub. No.: WO2013/029725
PCT Pub. Date: Mar. 7, 2013

(65) Prior Publication Data
US 2014/0217664 A1 Aug. 7, 2014

(30) Foreign Application Priority Data

Sep. 1, 2011 (DE) .......................... 10 2011 112 130

(51) Int. Cl.
*B60G 11/32* (2006.01)
*B60G 11/56* (2006.01)
*F16F 15/04* (2006.01)
*F16F 9/05* (2006.01)
(Continued)

(52) U.S. Cl.
CPC ................ *B60G 11/56* (2013.01); *B60G 11/62* (2013.01); *F16F 9/05* (2013.01); *F16F 13/002* (2013.01); *F16F 15/046* (2013.01); *F16F 2230/0052* (2013.01)

(58) Field of Classification Search
CPC ........ B60G 11/56; B60G 11/62; B60G 15/14; B60G 17/04; B60G 17/0525; F16F 13/002; F16F 15/046; F16F 9/05; F16F 2230/0052
USPC .................. 267/259, 35, 64.19, 64.21, 64.24, 267/64.27, 190, 201, 203, 220, 221
See application file for complete search history.

(56) References Cited

U.S. PATENT DOCUMENTS 3,246,905 A * 4/1966 Morgan .................... 280/6.159
4,555,096 A 11/1985 Pryor
(Continued)

FOREIGN PATENT DOCUMENTS

CN 1788171 6/2006
CN 1984790 6/2007
(Continued)

OTHER PUBLICATIONS

International Search Report issued by the European Patent Office in International Application PCT/EP2012/003201.
(Continued)

*Primary Examiner* — Pamela Rodriguez
(74) *Attorney, Agent, or Firm* — Henry M. Feiereisen LLC

(57) ABSTRACT

The invention relates to a pneumatic spring device for a motor vehicle, including a rolling piston (4), a pneumatic spring cover (5) axially movable thereto, and an interposed elastomer covering as rolling bellows (6) with a trapped compressible air volume. According to the invention, at least one additional spring element (3) is connected in series to the pneumatic spring (2), with a radial bearing (14) of the rolling piston (4) and/or the pneumatic spring cover (5) being integrated as torsion compensation.

9 Claims, 1 Drawing Sheet

(51) Int. Cl.
*B60G 11/62* (2006.01)
*F16F 13/00* (2006.01)

(56) References Cited

U.S. PATENT DOCUMENTS

| | | | |
|---|---|---|---|
| 6,102,378 | A | 8/2000 | Gieseler et al. |
| 2002/0148692 | A1* | 10/2002 | Jensen et al. ............... 188/313 |
| 2004/0222576 | A1 | 11/2004 | Oldenettel |
| 2006/0170140 | A1 | 8/2006 | Menk et al. |

FOREIGN PATENT DOCUMENTS

| | | |
|---|---|---|
| CN | 101765896 A | 6/2010 |
| CN | 101981338 A | 2/2011 |
| DE | 259138 C | 0/1912 |
| DE | 308708 C | 7/1917 |
| DE | 3608934 A1 | 9/1987 |
| DE | 19651138 A1 | 6/1997 |
| DE | 197 19 505 | 11/1998 |
| DE | 102004025765 A1 | 12/2004 |
| DE | 102004010301 A1 | 9/2005 |
| DE | 102004032083 A1 | 1/2006 |
| DE | 102006046559 A1 | 4/2008 |
| DE | 102006059897 | 6/2008 |
| DE | 102007052739 A1 | 5/2009 |
| DE | 102010026002 A1 | 3/2011 |
| EP | 1249357 | 10/2002 |
| EP | 1475255 A1 | 11/2004 |
| GB | 191315876 A | 0/1913 |
| WO | WO2004109149 A1 | 12/2004 |
| WO | WO 2007/033892 | 3/2007 |

OTHER PUBLICATIONS

Chinese Search Report issued by the Chinese Patent Office in Chinese Application CN 201280041562X.

Chinese Search Report issued by the Chinese Patent Office in counterpart Chinese Patent Application No. 201280041562X.

English translation of Chinese Search Report issued by the Chinese Patent Office in counterpart Chinese Patent Application No. 201280041562X.

* cited by examiner

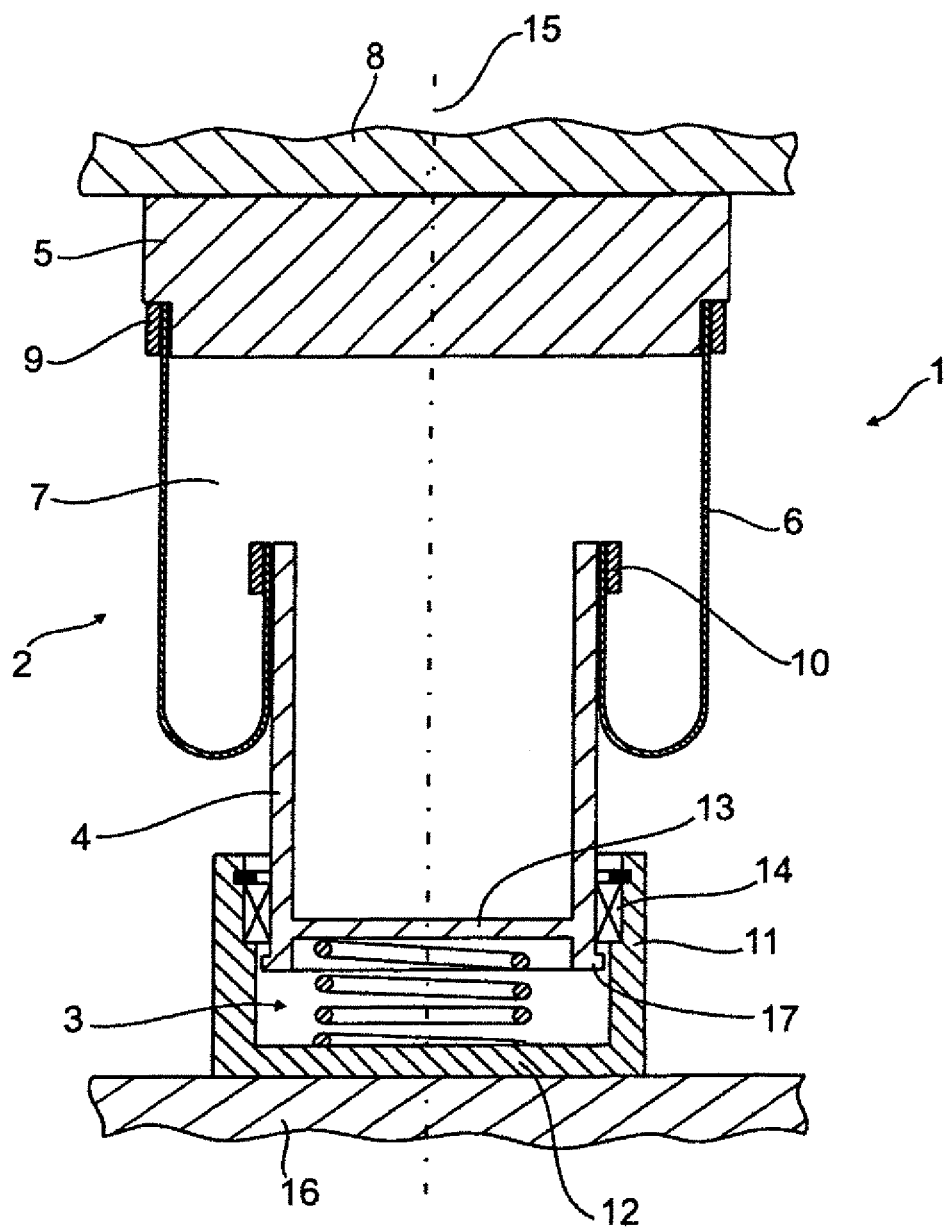

US 9,193,239 B2

PNEUMATIC SPRING DEVICE FOR A MOTOR VEHICLE

CROSS-REFERENCES TO RELATED APPLICATIONS

This application is the U.S, National Stage of International Application No. PCT/EP2012/003201, filed Jul. 27, 2012, which designated the United States and has been published as International Publication No. WO 2013/029725 and which claims the priority of German Patent Application, Serial No. 10 2011 112 130.0, filed Sep. 1, 2011, pursuant to 35 U.S.C. 119(a)-(d).

BACKGROUND OF THE INVENTION

The invention relates to a pneumatic spring device for a motor vehicle.

A generic pneumatic spring device includes a generally known pneumatic spring which includes a rolling piston, a pneumatic spring cover which is moveable in axial relation to the rolling piston, and an interposed elastomer bellows configured as a rolling bellows with trapped compressible air volume. The spring action of such a pneumatic spring is based on the compression of air in the trapped air volume, with the air volume decreasing during spring compression as the rolling bellows rolls off. As a result, the air pressure rises in the air volume, resulting in a spring force in combination with the effective area of the pneumatic spring.

Such a pneumatic spring is disadvantageous because it normally exhibits a firm behavior of the spring characteristic at small amplitudes of greater excitation frequency. This behavior is also described as harshness. Moreover, rolling bellows in such pneumatic springs normally involve so-called transverse bellows, which have a natural torsion leading to a torsion moment in the pneumatic spring. This torsional moment has an adverse effect on the axle as additional resistance in opposition to the spring compression. This results in a reduction in comfort in such air-sprung vehicles.

Further, a spring device of a chassis is known with a combination of a spring element and a position control, wherein a shock absorber can be omitted (DE 10 2004 010 301 A1). Particular properties of the afore-described generic pneumatic spring device are not indicated here.

SUMMARY OF THE INVENTION

Object of the invention is to further refine a generic pneumatic spring device such as to allow realization of an increase in comfort of air-sprung vehicles.

This object is achieved by connecting at least one additional spring element in series with the pneumatic spring. In addition, a radial bearing of the rolling piston and/or the pneumatic spring cover is integrated as torsion compensation. Central part of the function of the pneumatic spring device according to the invention is therefore the superposition of the pneumatic spring by the series connection with at least one additional spring element in conjunction with the torsion compensation. As a result of the series connection of the spring elements, the overall spring rate is reduced and opposes a firmness of the spring behavior. Further, the radial bearing of the rolling piston and/or the pneumatic spring cover compensates forced movements of the rolling bellows, in particular torsional movements of transverse bellows.

According to a generally known embodiment of the used pneumatic spring, the rolling bellows can be connected with one end by a cover clamp to the pneumatic spring cover. The other end of the rolling bellows is connected on the outside by a piston clamp to the rolling piston end which points to the pneumatic spring cover. When the spring is compressed, the rolling bellows thus rolls across the outer side of the rolling piston so that the trapped air volume is reduced and compressed.

To maintain the afore-described function, many of generally known embodiments of spring elements can basically be used as additional spring element for the series connection with the pneumatic spring. Particularly suitable are helical springs or elastomer elements.

A spring travel limitation of the spring element can be simply realized by using the block dimension of the spring element as spring compression limitation and at least one axial stop as spring extension limitation.

In a specific exemplary embodiment of a pneumatic spring device, a cylindrical bearing cup, preferably connected on the axle side, is provided in which the rolling piston is movable axially during spring actions. The rolling piston is hereby held and supported in the bearing cup by a radial bearing arranged on the inner wall of the bearing cup. Placed between the bearing cup bottom and rolling piston bottom is the spring element, preferably as helical spring. The spring extension limitation is established by arranging on the rolling piston in the lower region of the rolling piston bottom at least one radially projecting axial stop, preferably a circumferential stop collar, which impacts upon the radial bearing for spring extension limitation.

According to an alternative embodiment, the function of the series-connected additional spring element and the function of the radial bearing as torsion compensation can be combined in an elastomer component which is both axially deformable and twistable for a torsion compensation in accordance with the movement of the rolling piston. The elastomer component is dimensioned such that the torsional spring constant is small enough to enable a torsion compensation without great rebound force, especially when a transverse bellows is involved.

BRIEF DESCRIPTION OF THE DRAWING

An embodiment of a pneumatic spring device will be described in greater detail with reference to a drawing.

The sole FIGURE shows a pneumatic spring device 1 including a pneumatic spring 2 with a spring element as helical spring 3 additionally connected in series.

DETAILED DESCRIPTION OF PREFERRED EMBODIMENTS

The pneumatic spring 2 includes a rolling piston 4, a pneumatic spring cover 5 movable in axial relation thereto, and an interposed rolling bellows 6 with a trapped compressible air volume 7. The pneumatic spring cover 5 is connected here to a (schematically shown) body structure 8.

The rolling bellows 6 is configured as transverse bellows, and has an upper end connected by a cover clamp 9 to the pneumatic spring cover 5 about its circumference. The lower end of the rolling bellows 6 is connected accordingly to the upper rolling piston end by a piston clamp 10.

The lower region of the rolling piston 4 is received in a cylindrical bearing cup 11 for axial movement and axially supported by the helical spring 3 between the bearing cup bottom 12 and the rolling piston bottom 13. In addition, the rolling piston 4 is radially held and supported by a radial bearing 14 arranged on the inner wall of the bearing cup. The radial bearing 14 is constructed as a sliding bearing so that the rolling piston 4 is able to move into the bearing cup 11 and is rotatable in the radial bearing 14 about a bearing axis 15 for a torsion compensation of the rolling bellows 6, configured as transverse bellows, when the helical spring 3 is compressed and the spring length is shortened. The bearing cup 11 is connected here to a (schematically indicated) axle 16 of a chassis.

A limitation of the spring compression of the rolling piston 4 in the bearing cup 11 is established by the block dimension of the helical spring 4. A spring extension of the rolling piston 4 in the bearing cup 11 is limited by arranging a radially projecting axial stop 17 at the lower end of the rolling piston 4 in the manner of a circumferential stop collar, which impacts the radial bearing 14 from below in order to limit the spring extension.

The invention claimed is:

1. A pneumatic spring device for a motor vehicle, comprising:
    a pneumatic spring including a rolling piston, a pneumatic spring cover axially movable in relation to the rolling piston, and an elastomer bellows arranged between the rolling piston and the pneumatic spring cover and forming a rolling bellows configured to have a trapped compressible air volume, said rolling bellows being configured as transverse bellows;
    a cover clamp connecting one end of the rolling bellows to the pneumatic spring cover;
    a piston clamp connecting another end of the rolling bellows to an end of the rolling piston in facing relationship to the pneumatic spring cover;
    at least one additional spring element connected in series to the pneumatic spring; and
    a radial bearing arranged so that the rolling piston is axially movable and rotatable about a bearing axis in the radial bearing and configured to support the rolling piston during its axial movement and its rotation about the bearing axis in the radial bearing and to provide a torsion compensation of the traverse rolling bellows when the additional spring element is compressed and its length is shortened.

2. The pneumatic spring device of claim 1, wherein the additional spring element is a helical spring or an elastomer element.

3. The pneumatic spring device of claim 1, wherein a block dimension of the additional spring element is provided as a spring compression limitation, and at least one axial stop is provided as a spring extension limitation.

4. The pneumatic spring device of claim 1, further comprising a cylindrical bearing cup in which the rolling piston is movable axially during a spring action and held by the radial bearing, said radial bearing being arranged on an inner wall of the bearing cup so that the rolling piston moves axially in the radial bearing, said spring element being placed between a bottom of the bearing cup and a bottom of the rolling piston.

5. The pneumatic spring device of claim 4, wherein the bearing cup is configured for connection to an axle of a chassis of the motor vehicle.

6. The pneumatic spring of claim 4, wherein the radial bearing is a sliding bearing.

7. The pneumatic spring device of claim 1, wherein the rolling piston has at least one radially projecting axial stop to impact the radial bearing for limiting the spring extension.

8. The pneumatic spring device of claim 7, wherein the axial stop is configured as a circumferential stop collar.

9. The pneumatic spring device of claim 1, wherein a function of the additional spring element and a function of the radial bearing are combined in an elastomeric component which is both axially deformable and also twistable in accordance with a movement of the rolling piston.

* * * * *